(12) United States Patent
Blais et al.

(10) Patent No.: US 7,704,029 B2
(45) Date of Patent: Apr. 27, 2010

(54) ARRANGEMENT FOR RELEASABLY HOLDING A COMPONENT IN A FIXED POSITION ON A SHAFT

(75) Inventors: Daniel Blais, St. Jean sur Richelieu (CA); Roger Huppé, Brossard (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 115 days.

(21) Appl. No.: 11/942,001

(22) Filed: Nov. 19, 2007

(65) Prior Publication Data

US 2009/0131182 A1 May 21, 2009

(51) Int. Cl.
*F16B 39/10* (2006.01)
(52) U.S. Cl. .................................. 411/197; 411/533
(58) Field of Classification Search ............... 411/120, 411/432, 366.1, 310, 411, 333, 334, 366.3, 411/316, 317, 197–199, 353, 203, 533, 204, 411/209, 210, 312–314; 74/574.4, 60, 573.12
See application file for complete search history.

(56) References Cited

U.S. PATENT DOCUMENTS

| | | | | |
|---|---|---|---|---|
| 1,287,270 A | * | 12/1918 | Ensign | 411/198 |
| 2,904,800 A | * | 9/1959 | Peterson | 470/20 |
| 3,262,480 A | * | 7/1966 | Storch | 411/303 |
| 3,523,709 A | | 8/1970 | Heggy et al. | |
| 3,942,570 A | * | 3/1976 | Bochman et al. | 411/220 |
| 4,210,372 A | | 7/1980 | McGee et al. | |
| 4,214,796 A | | 7/1980 | Monzel et al. | |
| 4,493,597 A | | 1/1985 | Rolf | |
| 4,812,094 A | | 3/1989 | Grube | |
| 5,320,466 A | | 6/1994 | Suzuki | |
| 5,395,192 A | * | 3/1995 | Bennett | 411/120 |
| 5,415,509 A | | 5/1995 | Martin et al. | |
| 5,618,143 A | | 4/1997 | Cronin, II et al. | |
| 5,674,034 A | * | 10/1997 | Bennett | 411/197 |
| 5,772,373 A | | 6/1998 | Cronin, II et al. | |
| 5,947,625 A | | 9/1999 | Vauchel | |
| 6,095,735 A | * | 8/2000 | Weinstein et al. | 411/221 |
| 6,857,835 B2 | | 2/2005 | Wang et al. | |
| 6,896,463 B2 | | 5/2005 | Tuthill | |
| 7,029,218 B2 | * | 4/2006 | Peterkort | 411/198 |

* cited by examiner

*Primary Examiner*—Gary Estremsky
(74) *Attorney, Agent, or Firm*—Ogilvy Renault

(57) ABSTRACT

The arrangement comprises parts coaxially mounted on the shaft, the parts including: a lockplate in rotational engagement with the shaft, the lockplate having a first side and a second side, the first side of the lockplate being in engagement with the component; a nut in threaded engagement with the shaft, the nut having a circumferential outer groove, a side of the nut being in pressing engagement with the second side of the lockplate; a damping element mounted in the groove and partially outwardly protruding therefrom; a lockwasher provided around the nut and in rotational engagement with the lockplate, the lockwasher having an interior surface in interfering engagement with the damping element; and a retaining element connected to the nut and to the lockwasher, the retaining element preventing the lockwasher from moving away from the lockplate.

16 Claims, 3 Drawing Sheets

ARRANGEMENT FOR RELEASABLY HOLDING A COMPONENT IN A FIXED POSITION ON A SHAFT

TECHNICAL FIELD

The field of invention relates generally to arrangements for releasably holding a component in a fixed position on a shaft and, more particularly, to improved arrangements and methods for holding a component around a shaft and that can be used in environments of high rotational speeds, high accelerations/decelerations and/or high levels of vibrations.

BACKGROUND OF THE ART

Components mounted on shafts are oftentimes held on at least one of their sides by nuts coaxially mounted on the shafts. Nuts are oftentimes used with flat washers and spring-type lock washers provided between the component and the corresponding nut. Adhesives and other products can be used between the nut and the treads surrounding the shaft to prevent loosening of the nut. While these arrangements are suitable for many applications, it is not necessarily suitable for applications involving, for instance, high rotational speeds, sudden accelerations and/or decelerations, and/or high levels of vibrations. An example of such environment is present in a gas turbine engine. There is always a need to provide improvements in arrangements and methods of holding components mounted on shafts.

SUMMARY

It is therefore an object to provide an improved and relatively simple way of holding a component in a fixed position on a shaft.

In one aspect, the present concept provides an arrangement for releasably holding a component in a fixed position on a shaft, the arrangement comprising parts coaxially mounted on the shaft, the parts including: a lockplate in rotational engagement with the shaft, the lockplate having a first side and a second side, the first side of the lockplate being in engagement with the component; a nut in threaded engagement with the shaft, the nut having a circumferential outer groove, a side of the nut being in pressing engagement with the second side of the lockplate; a damping element mounted in the groove and partially outwardly protruding therefrom; a lockwasher provided around the nut and in rotational engagement with the lockplate, the lockwasher having an interior surface in interfering engagement with the damping element; and a retaining element connected to the nut and to the lockwasher, the retaining element preventing the lockwasher from moving away from the lockplate.

In a second aspect, the present concept provides a holding arrangement for a component to be mounted on a shaft, the arrangement comprising: a lockplate; means for preventing rotation of the lockplate with reference to the shaft; a nut to be mounted adjacent to the lockplate; means for securing the nut in a threaded engagement on the shaft; a lockwasher to be mounted around the nut; means for preventing rotation of the lockwasher with reference to the shaft; a resilient ring to be mounted between the nut and the lockwasher; and means for preventing the lockwasher from moving away from the lockplate.

In a third aspect, the present concept provides a method of securing one side of a component mounted on a shaft, the method comprising: inserting a lockplate on the shaft and engaging the lockplate against the side of the component, the lockplate being prevented from rotating with reference to the shaft; inserting a nut on the shaft and pressing the nut against the lockplate on a side of the lockplate that is opposite the component, the nut being threaded on the shaft prior to engagement with the lockplate; inserting a resilient element around the nut; inserting a lockwasher around the nut and the resilient element; and inserting a ring between the nut and the lockwasher.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
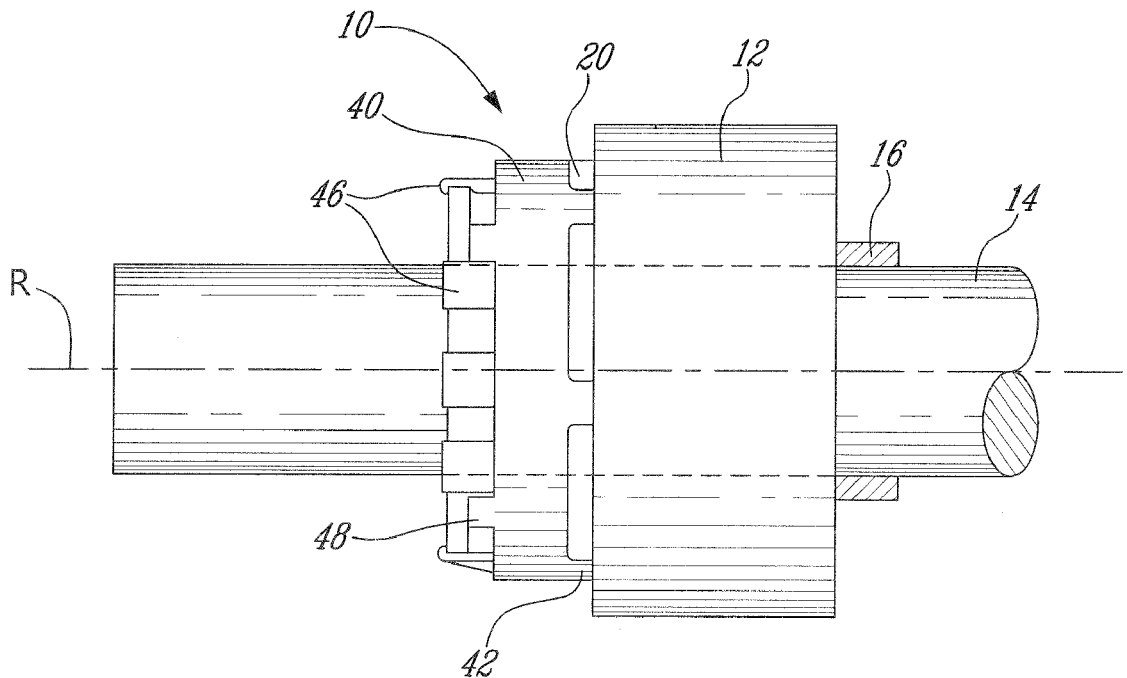
FIG. 1 is a schematic side view showing a component mounted around a shaft and having one side being held by an example of an improved arrangement.

FIG. 1 schematically shows an example of an arrangement 10 for releasably holding a component 12 in a fixed position on a shaft 14. The arrangement 10 comprises a plurality of parts that are coaxially mounted around the shaft 14. The shaft 14 rotates around a rotation axis R. The illustrated arrangement 10 being designed for high rotation speed applications, the various parts are symmetrically disposed around the rotation axis R and balanced so as to minimize vibrations during the rotations.

A non-limitative list of components 12 with which the arrangement 10 can be used includes gears, bearings, rotors, pulleys, etc. It should be noted that the word "component" in a singular form does not exclude the possibility of having a plurality of adjacent components 12 being held by a single arrangement 10. Also, some components 12, such as bearings, can have an outer portion that is rotating relative to the shaft 14. Such component 12 is still "in a fixed position" since the inner portion is not axially moving on the shaft 14.

In the illustrated example, only one arrangement 10 is used and the opposite side of the component 12 abuts on another element, for instance a shoulder 16 of the shaft 14. The component 12 can also abut against a second arrangement, or on any other arrangement or structure, depending on the needs.

FIG. 1 shows the arrangement 10 being directly engaged against one side of the component 12. It should be noted that the arrangement 10 can also be indirectly engaged against the side of the component 12 if another element is used, for instance a spacer.

Figure 2:
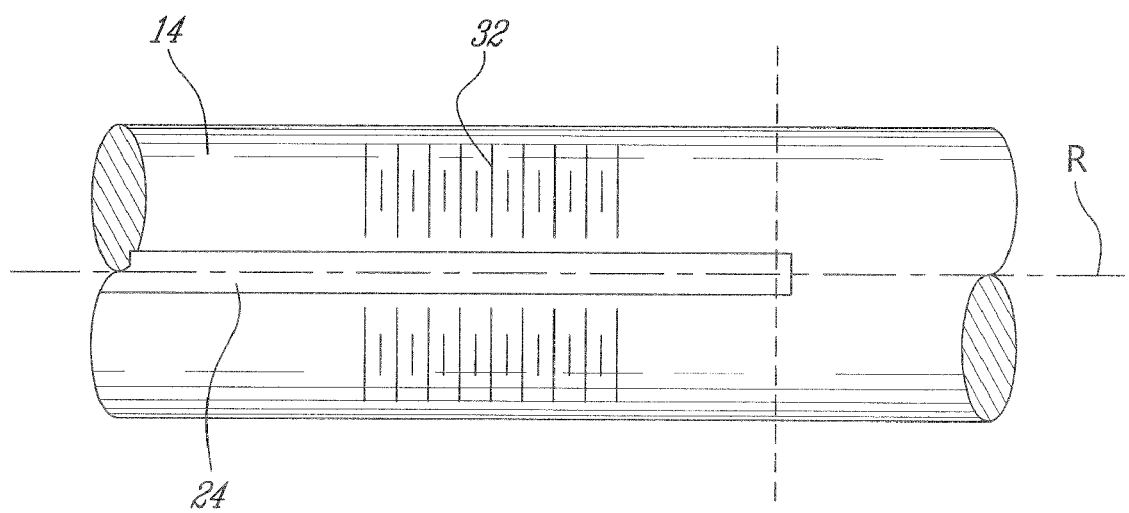
FIG. 2 is a schematic side view of a portion of a shaft around which the improved arrangement of FIG. 1 can be provided.

The illustrated arrangement 10 comprises a lockplate 20 having one of its main sides engaged against the component 12. As aforesaid, this engagement can be direct or indirect. The lockplate 20 is also in rotational engagement with the shaft 14. This means that the lockplate 20 and the shaft 14 are rotating together but that the lockplate 20 is still free to move axially, with reference to the shaft 14. Various means can be provided to achieve this goal. In the illustrated example, the lockplate 20 includes two opposite and inwardly projecting tabs 22 (FIG. 4) that fit in corresponding opposite slots 24 made on the outer surface of the shaft 14. As shown in FIG. 2, the slot 24 extends along a portion of the shaft 14, from an insertion point at the free end of the shaft 14 up to a final position of the lockplate 20. The stippled lines in FIG. 2 schematically illustrate where ends the side of the component 12.

In most of the cases, the component 12 would also be in rotational engagement with the shaft 14. It would then be possible to provide the rotational engagement between the lockplate 20 and the shaft 14 by connecting the lockplate 20 directly to the component 12.

Figure 3:
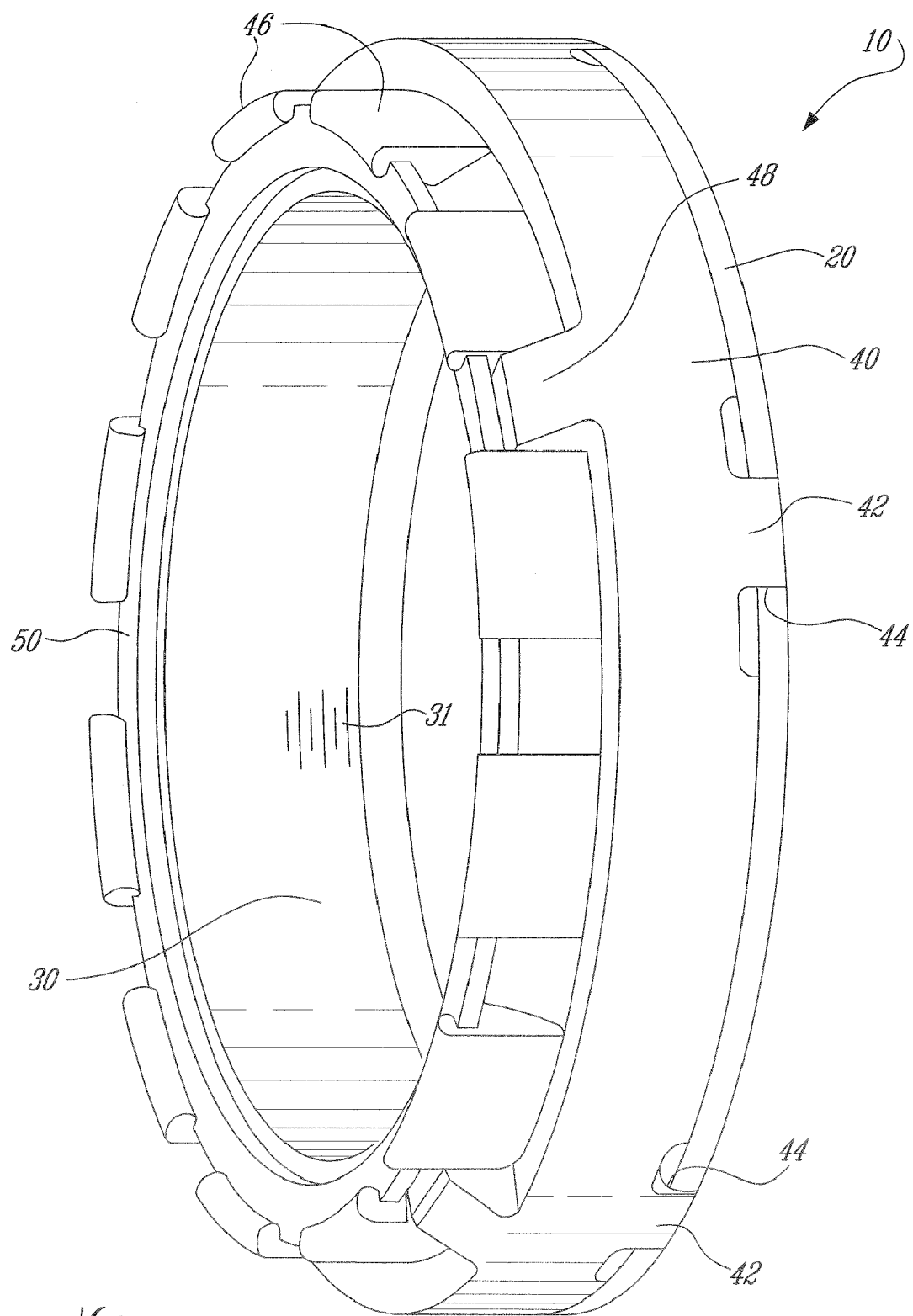
FIG. 3 is an isometric view of an example of an improved arrangement.
Figure 4:
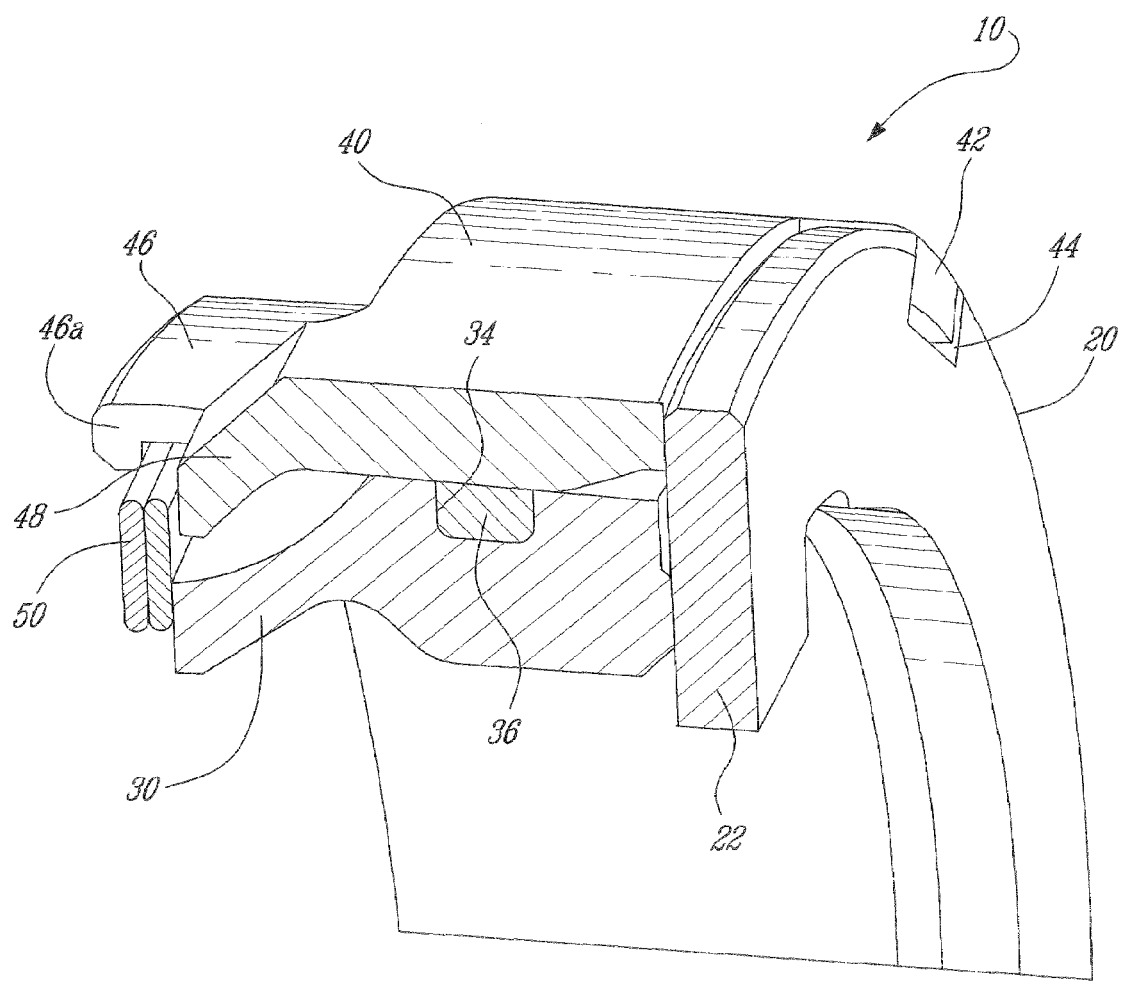
FIG. 4 is a cross section view of the arrangement of FIG. 3.

The arrangement 10 further comprises a nut 30 in threaded engagement with the shaft 14. The nut 30 is more clearly visible in FIGS. 3 and 4. FIG. 4 shows a cross section view of an example of an assembled arrangement 10. Threads 31 (FIG. 3) provided on the inner surface of the nut 30 can be replaced by one or more raised elements cooperating with outer threads 32 on the shaft 14. Other means of securing the nut 30 in a threaded engagement of the shaft 14 can also be devised, for example by having internal threads on the nut 30 and raised elements on the shaft 14.

As shown in FIG. 4, the illustrated nut 30 comprises a circumferential outer groove 34 in which a damping element 36 is mounted. The damping element 36 can be in the form of a one-piece resilient ring partially outwardly protruding from the groove 34 and that is in interfering engagement with an interior surface of a lockwasher 40 provided around the nut 30. The interfering engagement is caused by the fact that the outer diameter of the uncompressed damping element 36 is larger than the inner diameter of the lockwasher 40. The damping element 36 is damping the lockwasher nodal diameter (ND) and nodal circumferential (NC) modes. Damping element 36 is located away from the nodal circumferential (NC) lines to avoid rocking action of the lockwasher 40.

The damping element 36 can be made of rubber or any other suitable material. Preferably the material is generally elastomeric in nature, such that the material elastically deforms in use, to thereby damp vibrations, without appreciable plastic deformation. The lockwasher 40 is mounted around the nut 30 and is also in rotational engagement with the lockplate 20. The rotational engagement can be provided by a plurality of tabs 42 axially extending from the lockwasher 40 and received in corresponding grooves 44 made in the periphery of the lockplate 20. Other means for preventing rotation of the lockwasher 40 with reference to the shaft 14 can be devised. For instance, the axially-projecting tabs 42 can be made integral with the lockplate 20 and the lockwasher 40 can include the grooves for receiving these tabs 42.

The illustrated arrangement 10 is completed by a plurality of locking tabs 46 made integral with the nut 30 on the side opposite the lockplate 20. The lockwasher 40 is also provided with a plurality of tabs 48 made integral with the main portion of the lockwasher 40. As shown in FIGS. 3 and 4, the arrangement 10 comprises a ring 50 around which the tabs 46 are connected. The tabs 48 abut against one side of the ring 50, while the tabs 46 of the nut 30 have a hook-shaped end 46a (FIG. 4) reaching the opposite side of the ring 50. The ring 50 can also be replaced by another retaining element that would not be a ring. For instance, the retaining element could be a shoulder at the end of an adjacent element mounted on the shaft.

In use, one side of a component 12 mounted on a shaft 14 can be held in position by inserting the lockplate 20 on the shaft 14 and engaging the lockplate 20 against the side of the component 12, with the lockplate 20 being prevented from rotating with reference to the shaft 14. The nut 30 is inserted on the shaft 14 and is threaded to the shaft 14 until it pushes on a side of the lockplate 20 that is opposite the component 12, thereby creating a pressing engagement. The damping element 36 is inserted around the nut 30 and the lockwasher 40 is then also inserted around the nut 30 and over the damping element 36. The ring 50 is connected to the locking tabs 46 of the nut 30 for completing the assembly.

The above description is meant to be exemplary only, and one skilled in the art will recognize that changes may be made to the embodiments described without departing from the scope of the invention disclosed. For example, the shape of the various parts can be different than the ones illustrated and described. As aforesaid, the lockplate can be either directly of indirectly engaged against the component. More than one component can be held by a single arrangement. The damping element can be provided around the nut prior to the installation of the nut on the shaft. It can also be made of a plurality of pieces instead of a one-piece element. The rotational engagement between the lockplate and the shaft can be made using tabs or an equivalent structure outwardly projecting from the shaft and cooperating with grooves in the lockplate. The word "groove" or "grooves" is an equivalent of hole(s) and also includes a space between two spaced-apart elements so as to create the equivalent of a groove. Furthermore, although the improved arrangement and method are well adapted for use in environments of high rotational speeds, high accelerations/decelerations and/or high levels of vibrations, it is possible to use the arrangement in other environments as well. Still other modifications which fall within the scope of the present invention will be apparent to those skilled in the art, in light of a review of this disclosure, and such modifications are intended to fall within the appended claims.

What is claimed is:

1. An arrangement releasably holding a component in a fixed position on a shaft, the arrangement comprising parts coaxially mounted on the shaft, the parts including:
   a lockplate in rotational engagement with the shaft, the lockplate having a first side and a second side, the first side of the lockplate being in engagement with the component;
   a nut in threaded engagement with the shaft, the nut having a circumferential outer groove, a side of the nut being in pressing engagement with the second side of the lockplate;
   a damping element mounted in the groove and partially outwardly protruding therefrom;
   a lockwasher provided around the nut and in rotational engagement with the lockplate, the lockwasher having an interior surface in interfering engagement with the damping element; and
   a retaining element connected to the nut and to the lockwasher, the retaining element preventing the lockwasher from moving away from the lockplate.

2. The arrangement as defined in claim 1, wherein the rotational engagement between the lockplate and the shaft includes tabs projecting inwardly and cooperating with longitudinally-extending corresponding grooves provided on the shaft.

3. The arrangement as defined in claim 1, wherein the rotational engagement between the lockwasher and the lockplate includes a plurality of spaced-apart and axially-projecting tabs cooperating with corresponding grooves provided on the lockplate.

4. The arrangement as defined in claim 3, wherein the grooves of the lockplate are provided at a periphery thereof.

5. The arrangement as defined in claim 1, wherein the retaining element includes a ring.

6. The arrangement as defined in claim 5, wherein the ring is held between tabs projecting from the lockwasher and the nut.

7. The arrangement as defined in claim 1, wherein the damping element is made of an elastomeric material.

8. A holding arrangement for a component to be mounted on a shaft, the arrangement comprising:
   a lockplate;
   means for preventing rotation of the lockplate with reference to the shaft;
   a nut to be mounted adjacent to the lockplate;
   means for securing the nut in a threaded engagement on the shaft;
   a lockwasher to be mounted around the nut;
   means for preventing rotation of the lockwasher with reference to the shaft;
   a resilient ring to be mounted between the nut and the lockwasher and contacting an outer radial surface of the nut and an inner radial surface of the lockwasher to dampen movement of the lockwasher with respect to the nut; and
   means for preventing the lockwasher from moving away from the lockplate.

9. The holding arrangement as defined in claim 8, wherein the means for preventing rotation of the lockplate with reference to the shaft include tabs projecting inwardly and cooperating with longitudinally-extending corresponding grooves provided on the shaft.

10. The holding arrangement as defined in claim 8, wherein the means for preventing rotation of the lockwasher with reference to the shaft include a plurality of spaced-apart and axially-projecting tabs cooperating with corresponding grooves provided on the lockplate.

11. The holding arrangement as defined in claim 10, wherein the grooves of the lockplate are provided at a periphery thereof.

12. The holding arrangement as defined in claim 8, wherein the means for preventing the lockwasher from moving away from the lockplate include a retaining element linking the lockwasher and the nut.

13. The holding arrangement as defined in claim 12, wherein the retaining element includes a ring.

14. The holding arrangement as defined in claim 13, wherein the ring is held between tabs projecting from the lockwasher and the nut.

15. The holding arrangement as defined in claim 8, wherein the resilient ring is made of an elastomeric material.

16. The holding arrangement as defined in claim 15, wherein the resilient ring is a one-piece element.

* * * * *